(12) United States Patent
Ishii (10) Patent No.: US 7,788,479 B2
(45) Date of Patent: Aug. 31, 2010

(54) APPARATUS, SYSTEM AND METHOD OF ENSURING THAT ONLY RANDOMLY-GENERATED NUMBERS THAT HAVE PASSED A TEST ARE USED FOR CRYPTOGRAPHIC PURPOSES

(75) Inventor: Koji Ishii, Shiga (JP)

(73) Assignee: International Business Machines Corporation, Armonk, NY (US)

( * ) Notice: Subject to any disclaimer, the term of this patent is extended or adjusted under 35 U.S.C. 154(b) by 1722 days.

(21) Appl. No.: 10/202,721

(22) Filed: Jul. 25, 2002

(65) Prior Publication Data

US 2004/0019798 A1 Jan. 29, 2004

(51) Int. Cl.
*H04L 9/26* (2006.01)
*H04L 9/20* (2006.01)
*H04L 29/00* (2006.01)

(52) U.S. Cl. .......................... 713/150; 380/44; 708/250; 714/30; 713/151; 713/152

(58) Field of Classification Search ................. 708/250; 713/150

See application file for complete search history.

(56) References Cited

U.S. PATENT DOCUMENTS

| | | | | |
|---|---|---|---|---|
| 5,138,619 A | * | 8/1992 | Fasang et al. | 714/718 |
| 5,416,783 A | * | 5/1995 | Broseghini et al. | 714/728 |
| 5,592,424 A | * | 1/1997 | Maeno | 365/201 |
| 6,195,433 B1 | * | 2/2001 | Vanstone et al. | 380/285 |
| 6,385,727 B1 | * | 5/2002 | Cassagnol et al. | 713/193 |
| 6,675,113 B2 | * | 1/2004 | Hars | 702/75 |
| 6,701,476 B2 | * | 3/2004 | Pouya et al. | 714/727 |
| 6,708,273 B1 | * | 3/2004 | Ober et al. | 713/189 |
| 6,757,832 B1 | * | 6/2004 | Silverbrook et al. | 713/194 |
| 6,816,968 B1 | * | 11/2004 | Walmsley | 713/168 |
| 7,031,991 B2 | * | 4/2006 | Hars | 708/250 |

OTHER PUBLICATIONS

Federal Information Processing Standards Publication 140-1: Security Requirements for Cryptographic Modules, Jan. 1994 pp. 43-46.*
Federal Information Processing Standards Publication 140-1: Security Requirements for Cryptographic Modules, Jan. 1994 pp. 43-46. Found on the World Wide Web at: http://csrc.nist.gov/publications/fips/fips140-1/fips1401.pdf.*

(Continued)

*Primary Examiner*—Syed A. Zia
*Assistant Examiner*—Jeremiah Avery
(74) *Attorney, Agent, or Firm*—Garg Law Firm, PLLC; Rakesh Garg; Libby Z. Toub (57) ABSTRACT

A method, system and apparatus for ensuring that only randomly generated numbers that have passed a test is used for cryptographic purposes are provided. When a random number is generated, it undergoes a built-in self-test (BIST). If the number passes the test, it is forwarded to a cryptographic device to be used for cryptographic purposes. If the number does not pass the test, a signal is instead forwarded to the cryptographic device to indicate the failure of the test. In a particular embodiment, only one data line is used to forward either the randomly generated number or the signal. A selector is used to facilitate the selection between the number and the signal.

14 Claims, 7 Drawing Sheets

OTHER PUBLICATIONS

Federal Information Processing Standards Publication 140-1: Security Requirements for Cryptographic Modules, Jan. 1994 pp. 43-46. Found on the World Wide Web at: http://csrc.nist.gov/publications/fips/fips140-1/fips1401.pdf.*

Hortensius, P.D.; McLeod, R.D.; Pries, W.; Miller, D.M.; Card, H.C. Cellular Automata-based Pseudorandom Number Generators for Built-In Self-Test. Pub. Aug. 1989. Computer-Aided Design of Integrated Circuits and Systems. Relevant pp. 842-859. Found on the World Wide Web at: http://ieeexplore.ieee.org/stamp/stamp.jsp?tp=&arnumber=31545.*

Federal Information Processing Standards Publication 140-2 *Security Requirements For Cryptographic Modules*, May 2001.

* cited by examiner

| STEPS | LEFT SHIFTER | RIGHT SHIFTER | COMPARATOR OUTPUT | LATCH OUTPUT | OR GATE OUTPUT |
|---|---|---|---|---|---|
| 1 | $N_1$ | ? | ? | ? | ? |
| 2 | $N_2$ | $N_1$ | $0_1$ | ? | ? |
| 3 | $N_3$ | $N_2$ | $0_2$ | $0_1$ | 0 |
| 4 | $N_4$ | $N_3$ | $0_3$ | $0_2$ | 0 |
| 5 | $9119_1$ | $N_4$ | $0_4$ | $0_3$ | 0 |
| 6 | $9119_2$ | $9119_1$ | $1_1$ | $0_4$ | 1 |
| 7 | $9119_3$ | $9119_2$ | $1_2$ | $1_1$ | 1 |
| 8 | $N_5$ | $9119_3$ | $0_5$ | $1_2$ | 1 |
| 9 | $N_6$ | $N_5$ | $0_6$ | $0_5$ | 0 |
| ○○○ | ○○○ | ○○○ | ○○○ | ○○○ | ○○○ |

APPARATUS, SYSTEM AND METHOD OF ENSURING THAT ONLY RANDOMLY-GENERATED NUMBERS THAT HAVE PASSED A TEST ARE USED FOR CRYPTOGRAPHIC PURPOSES

BACKGROUND OF THE INVENTION

1. Technical Field

The present invention is directed to secure communications networks. More specifically, the present invention is directed to a method, system and apparatus for ascertaining that only randomly generated numbers that have passed a test are used in encrypting and decrypting data.

2. Description of Related Art

The Internet is being used more and more to transact sensitive information. Sensitive information includes proprietary documents, credit card information, financial data or any data or information that a user may not want the public at large to obtain. The Internet, however, is an open network environment and thus requires a high level of security to ensure that sensitive information remains private. To provide the requisite security, encryption is used.

When data is encrypted, the data is ciphered. To decipher the data, a secret key or password is used. Specifically, when two computer systems have to transfer sensitive information to each other over the Internet, they do so by opening a Secure Socket Layer (SSL) connection. SSL is a security protocol that uses a public key to encrypt data and a private key to decrypt the encrypted data. The public key can be obtained from the computer systems themselves while the private key is kept secret. For example, when a client system needs to establish a secure connection with a server (or with any other computer system for that matter), it contacts the server to indicate so. The server then generates a public key/private key pair and passes the public key to the client. Using the public key, the client encrypts the sensitive data that is to be transferred to the server. Only the server has the corresponding private key to decrypt the encrypted data.

The client may also generate its own public key/private key pair and pass the public key to the server. The server will then encrypt all sensitive information that is to be transferred to the client using the client's public key. As in the case of the server, only the client has the private key with which the encrypted data may be decrypted.

As is well known in the field, to generate public key/private key pairs, random number generators (RNGs) are used. However, computer systems are deterministic devices. That is, for every input there is a particular output and thus, true random number generators (TRNGs) are difficult to implement. Consequently, pseudo-random number generators (PRNGs) are mostly used. A PRNG uses a seed (a random stream of bits that is used to generate a usually longer stream of bits) to produce numbers that have a random distribution of bits. Hence, the seeds used to generate the numbers have to themselves be random in order for the generated numbers to be random.

In any event, because security protocols, such as SSL, rely on the unpredictable nature of the keys they use, RNGs must meet stringent requirements. One of those requirements is that users who are bent on breaking encryption code (i.e., attackers, as known in the field), including those who know the RNG design, must not be able to make any useful predictions about the generated numbers. Thus, to ensure that is indeed so, each number generated by an RNG is tested for its relative unpredictability. If the number passes the test, it is used; otherwise, it is discarded. Most RNGs use an integrated hardware device known as a built-in self-test or BIST to perform the test.

Presently, RNG cores that contain an RNG and a BIST hardware are being manufactured and sold. The RNG cores have two outputs, a test status line to provide the status of the test and a data line to provide the generated number. To implement a cryptographic module, both the test status line and the data line have to be connected to a cryptographic device (i.e., the device performing the cryptographic functions).

Using a test status line to provide the result of the test and a data line to provide the data to the cryptographic device may not be an ideal configuration. For example, suppose the BIST outputs a logical one (1) to indicate that a number has passed the test and a logical zero (0) to indicate that it has failed the test. Suppose further that due to a mechanical, electrical or any other problem including an attacker-induced problem, the test result always comes out as a one (1). If a generated number did not pass the test, the cryptographic device will nonetheless use the number. Hence, if the seeds used are a recurring sequence of numbers, an attacker may be able to predict the corresponding generated numbers and thus the cryptographic keys based on previously observed recurring sequences of numbers.

Alternatively, if due to any of the problems mentioned above, the RNG core constantly outputs a particular number or a sequence of numbers. Further, if the numbers that have actually passed the test are different from the numbers transferred. Then, the cryptographic device will use the transferred numbers. Thus, an attacker may be able to predict the numbers based on previously observed recurring numbers or sequences of numbers.

Thus, what is needed is a method, system and apparatus for ensuring that only generated random numbers that have truly passed a BIST are used for encryption purposes.

SUMMARY OF THE INVENTION

The present invention provides a method, system and apparatus for ensuring that only randomly generated numbers that have passed a test is used for cryptographic purposes. When a random number is generated, it undergoes a built-in self-test (BIST). If the number passes the test, it is forwarded to a cryptographic device to be used for cryptographic purposes. If the number does not pass the test, a signal is instead forwarded to the cryptographic device to indicate that the number does not pass the test. In a particular embodiment, only one connection line is used to forward either the randomly generated number or the signal. A selector is used to select between the number and the signal.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
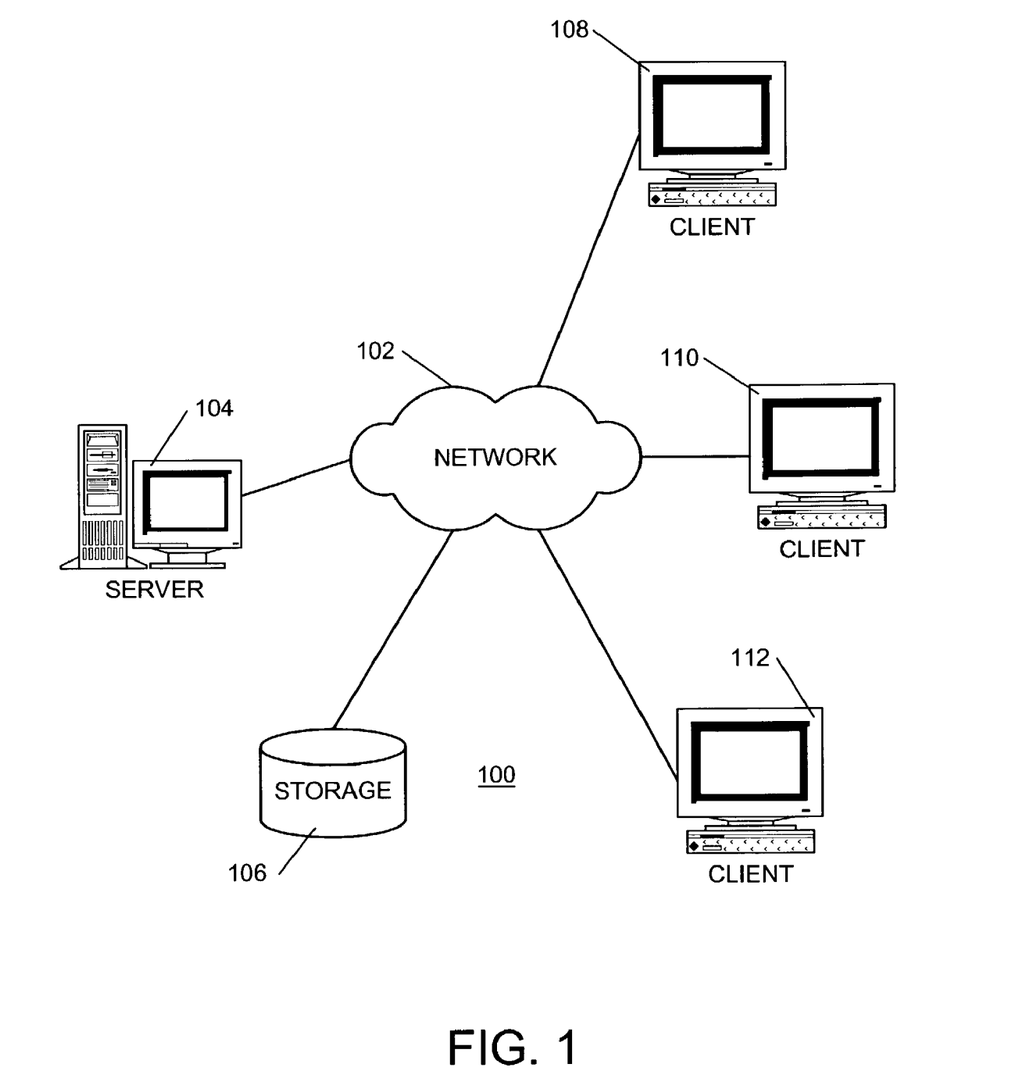
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
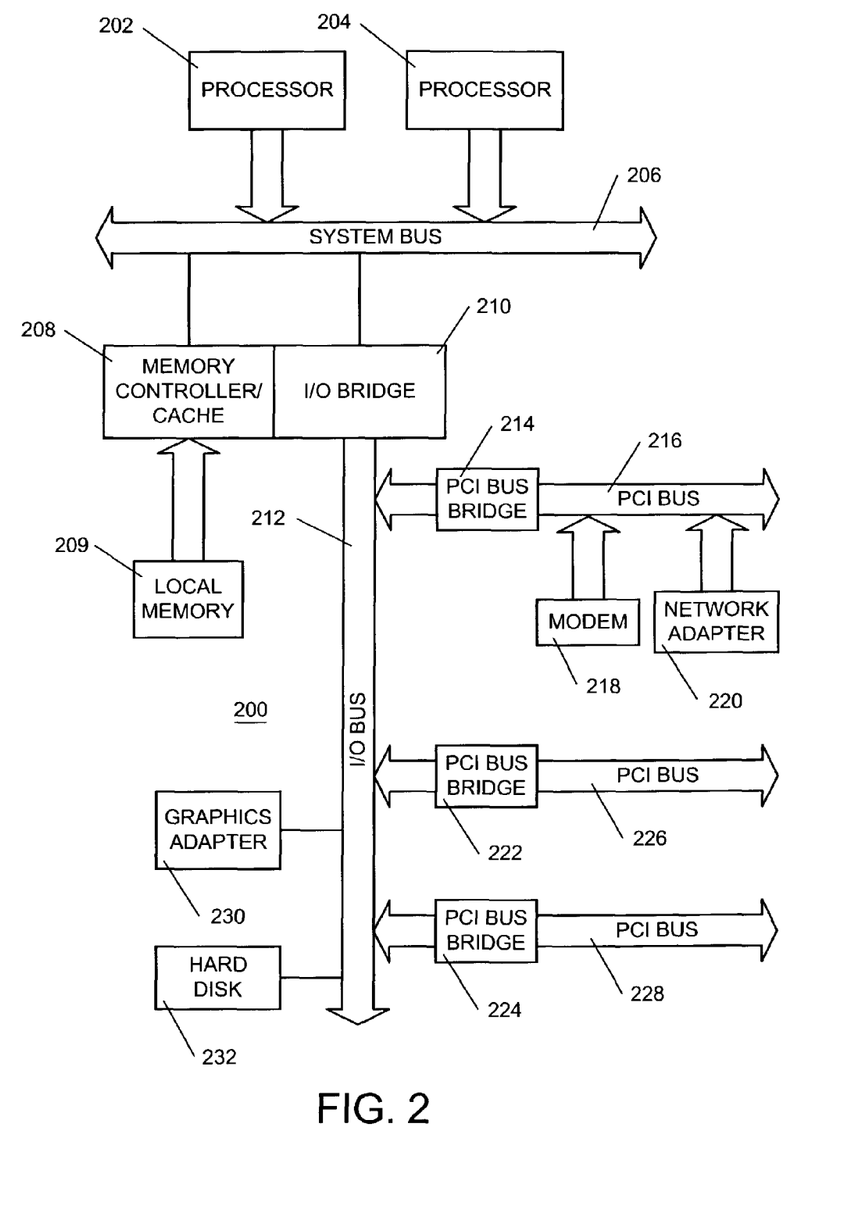
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and: hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
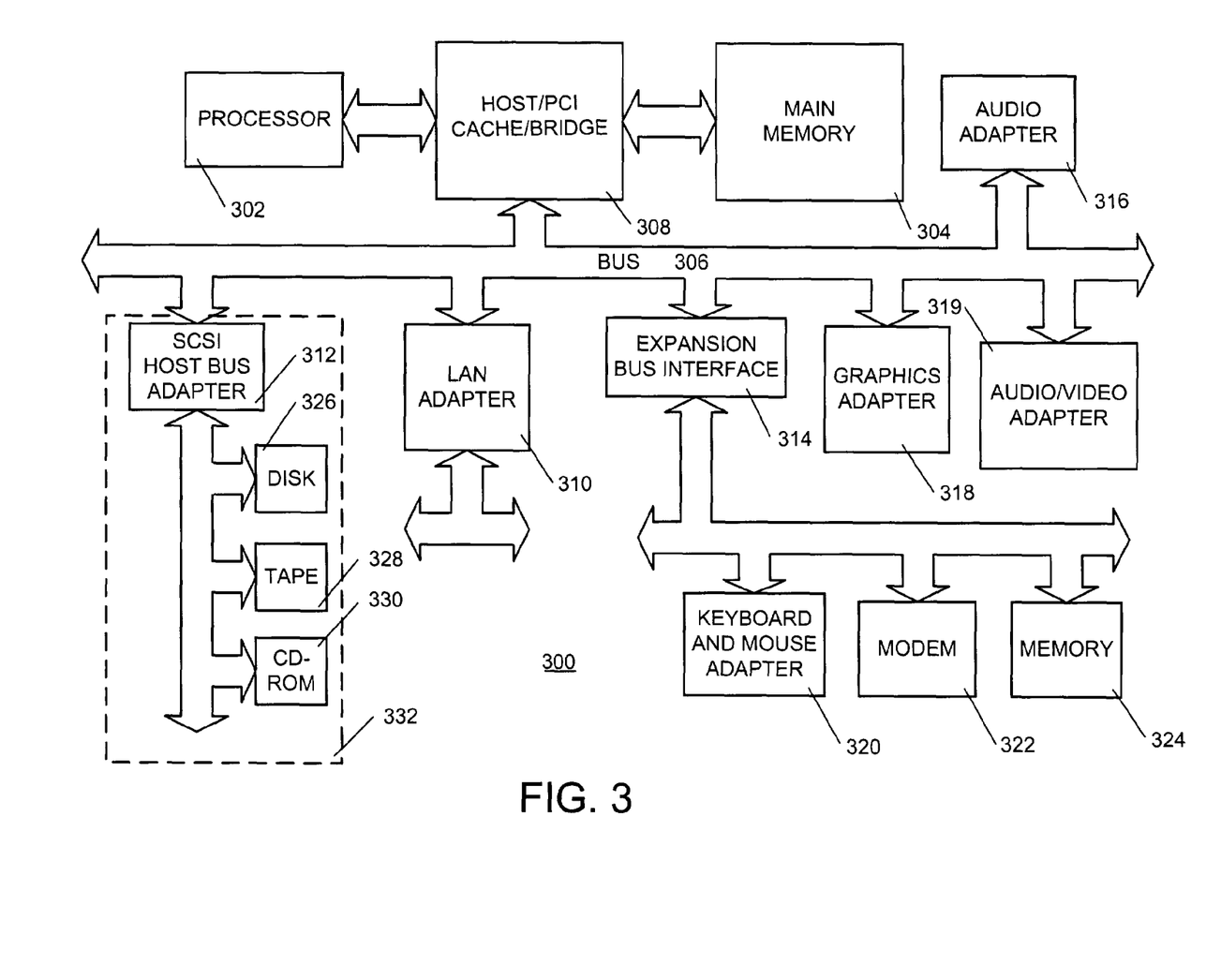
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention may be implemented in a hardware security module (HSM). An HSM is a tamper-resistant adapter or a piece of hardware that provides secure key generation, secure key storage and secure key archival. If an HSM is ever tampered with, all information is zeroed out. A co-processor inside the HSMs handles the generation of public key/private key pairs, encryption as well as decryption of sensitive information. Thus, the invention may reside in network adapter 220 of FIG. 2 and LAN adapter 310 of FIG. 3 provided that they are HSMs. Alternatively, the invention may reside anywhere in the computer systems illustrated in FIGS. 2 and 3 so long as sensitive data is encrypted before entering network 102 of FIG. 1 and decrypted once received from the network.

Figure 4:
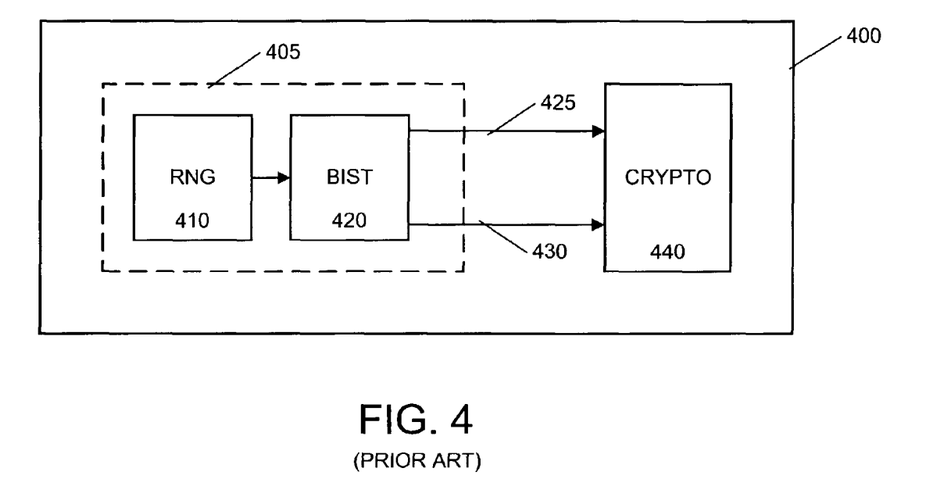
FIG. 4 is a prior art cryptographic core.

FIG. 4 is a prior art cryptographic module 400. The cryptographic module 400 contains a random number generator (RNG) core 405 and a cryptographic device 440. The RNG core 405 includes an RNG 410 and a BIST 420. The RNG 410 uses a storage device (not shown) to store collected random bits (i.e., the seed). Depending on the implementation of the RNG 410, the random bits may be collected from a user's keystrokes, mouse movements, Johnson noise, the radioactive decay of an object or any source that provides random bits or a combination thereof. When the cryptographic device 440 is in need of a random number, it makes a request or a call to the RNG core 405. At that point, the BIST 420 performs a random test on n bits (i.e., the number).

The number of bits (i.e., n) is dependent upon the processor used to implement the cryptographic device. If a 16-bit or a 32-bit processor is used then n=16 or 32, respectively. Most modern cryptographic devices use at least 128-bit numbers or data and at least a 16-bit processor to perform cryptographic functions. Thus, if a 128-bit data is used for performing the cryptographic functions, a 16-bit processor will have to make eight (8) calls to the RNG core 405 to obtain the 128-bit data.

The test must be administered on m bits, where m>15. But, in cases where a less than 16-bit processor is used (e.g., an 8-bit processor), n bits are generated at a time, where n<15. Consequently, at least two generated numbers have to be combined together to obtain the requisite m bits. However, since as mentioned above, at least 16-bit processors are used in cryptography, then at least 16-bit numbers are generated at a time, where $n \geq 16$. Thus, it will henceforth be assumed that the test is performed on each single n-bit number generated, where n=m>15.

The BIST 420 passes both the generated number and the result of the test to the cryptographic device 440 using data line 425 and test status line 430, respectively. As mentioned earlier there may be instances when a number that has not been tested or that was tested, but failed the test, is nonetheless used. The present invention ensures that only generated numbers that have truly passed the BIST are used.

Figure 5:
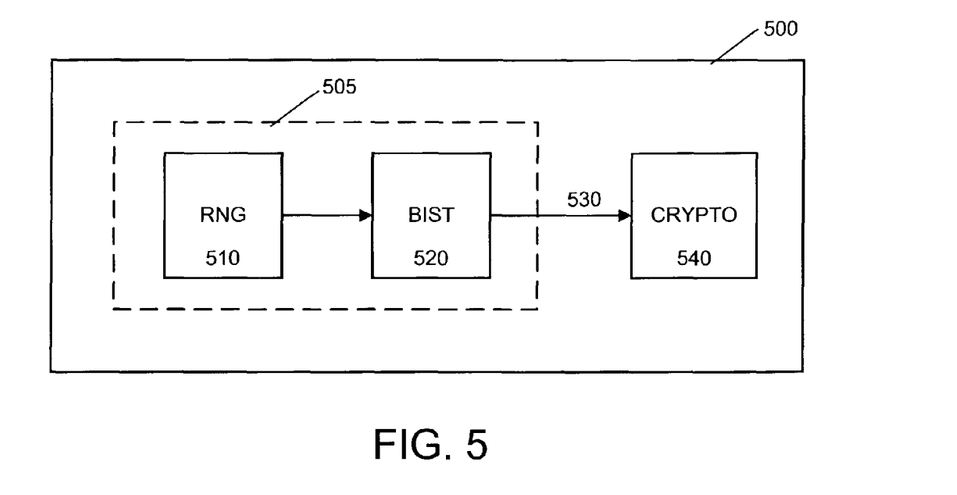
FIG. 5 is a particular embodiment of a cryptographic core of the present invention.

FIG. 5 is a particular embodiment of a cryptographic module 500 of the present invention. The cryptographic module 500 contains an RNG core 505 and a cryptographic device 540. Just as before, the RNG core 505 includes an RNG 510 that collects and stores random bits in a storage device (not shown). When the cryptographic device 540 is in need of a random number, n bits (or a number), where $n \geq 16$ are tested for their randomness. However, only one transmission line (i.e., transmission line 530) is used to transfer either the result of the test or the generated number to the cryptographic device 540. For example, when the test has failed, a signal indicating that the test has failed is passed to the cryptographic device 540. If the test has passed, the generated n-bit number is instead transferred. Note that although one line is shown to represent transmission line 530, transmission line 530 may be a plurality of lines to enable parallel transfer of the bits that make up the number to the cryptographic device 540.

Figure 6:
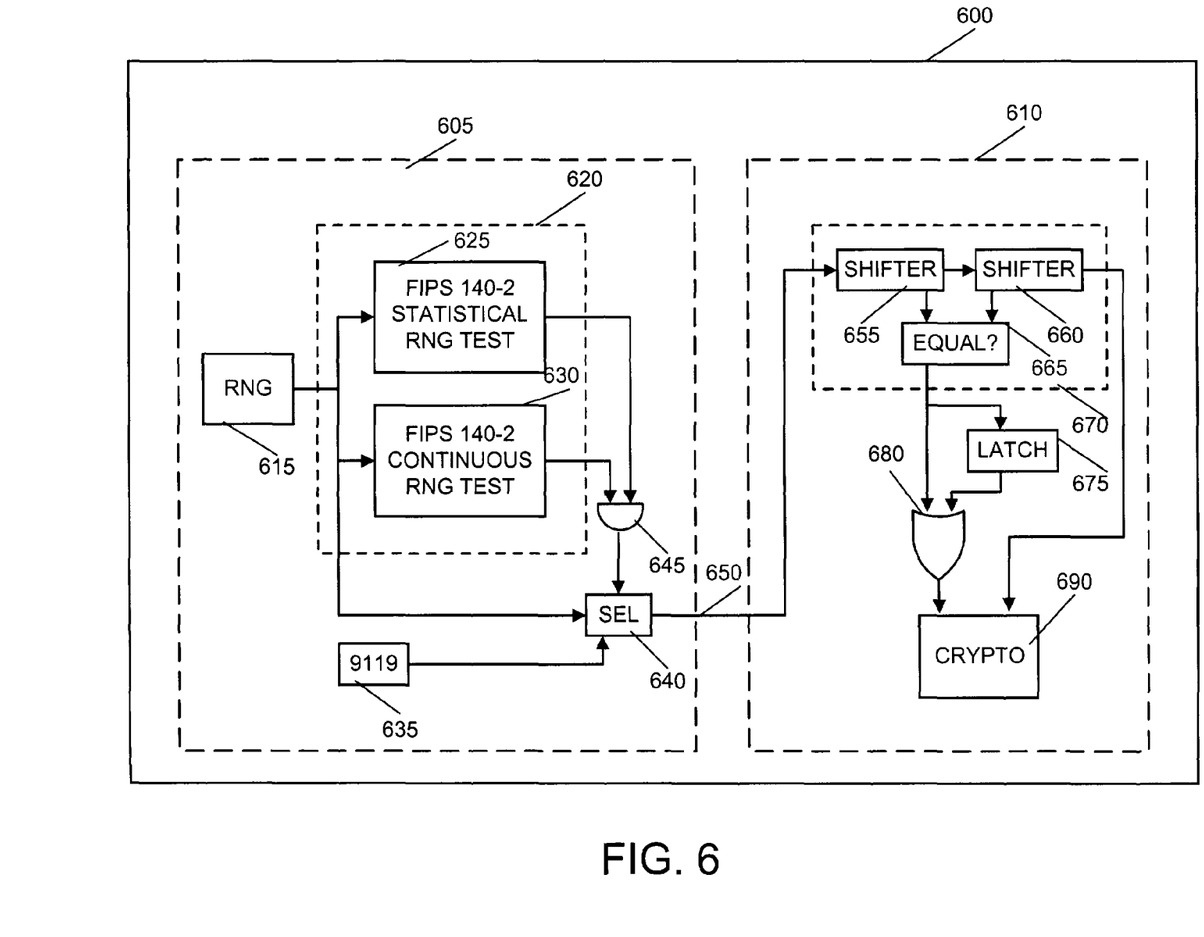
FIG. 6 is a detailed implementation of FIG. 5.

FIG. 6 is a detailed implementation of FIG. 5. In FIG. 6, cryptographic module 600 is shown containing an RNG core 605 and a cryptographic core 610. The RNG core 605 includes an RNG 615 that collects and stores random bits in a storage device (not shown). Again, when the cryptographic device wants a random number, it places a call to the RNG core 605. Upon receiving the call, n-bit random bits (where $n \geq 16$) are tested by BIST 620 for randomness. The BIST 620 includes a statistical test hardware 625 and a continuous test hardware 630. The statistical test hardware 625 performs a statistical test on each 20,000 bits collected and the continuous test hardware 630 performs a continuous test on each generated n-bit number.

Both tests are well delineated in Chapter 4.9 entitled Self-Tests of the Federal Information Processing Standards Publication 140-2 (or FIPS PUB 140-2); thus, they will not be further explained in this disclosure. FIPS PUB 140-2 is a United States Department of Commerce publication that contains security requirements for cryptographic modules. It may be found at csrc.nist.gov/publications/fips/fips140-2/ fips1402.pdf. Nonetheless as a reference, a current copy is provided in an Information Disclosure Statement filed concurrently with the present application. The publication is hereby incorporated by reference.

The result of the statistical test and continuous test may each be used as inputs to a two-input AND gate 645. The output of the AND gate 645 may be used to drive a selector 640. In addition to the output of the AND gate 645, the selector 640 has two more inputs and one output. The additional inputs are the output of RNG 610 and the output of a device 635 that generates n-bit blocks of "9119", where n=the number of bits in a generated number. According to this particular implementation of the invention, when the BIST is passed, the selector 640 outputs the randomly generated number. When any one of the two tests or both tests are not passed, the RNG core 605 is in an error state and outputs a string of n-bit blocks of "9119" as a signal to indicate that the BIST has failed. In this embodiment, three n-bit blocks of "9119" are used to make up the string, although two may suffice.

Note that in this embodiment an AND gate is used to drive the selector 640. However, any combinational logic gate or equivalent device may be used so long as the output of the logical gate or the device drives the selector 640 to choose the randomly generated number if both tests are passed or the n-bit blocks of "9119" if any one or both tests are not passed. Consequently the present invention is not restricted to the use of an AND gate.

The output of the selector 640 is fed into comparator 670. The comparator 670 has two n-bit shift registers, registers 655 and 660, where n=the number of bits in a generated number. The data or the numbers in the two shift registers are compared to determine whether or not they are different from each other. If they are different from each other, a logical zero (0) or low bit is outputted. Otherwise, a logical one (1) or high bit is outputted. The output of the comparator 670 goes into a latch 675 and to one of two inputs of an OR gate or equivalent device 680.

The latch 675 is used as a delaying mechanism. Any bit that goes into the latch is delayed by one processing step. The output of the latch is used as the other input of the OR gate 680. The output of the OR gate is used to drive the cryptographic device 690. For example, a low bit from the OR gate 680 enables the cryptographic device 690 to use the number in shift register 660 whereas a high bit inhibits the cryptographic device from using the number.

Figure 7:
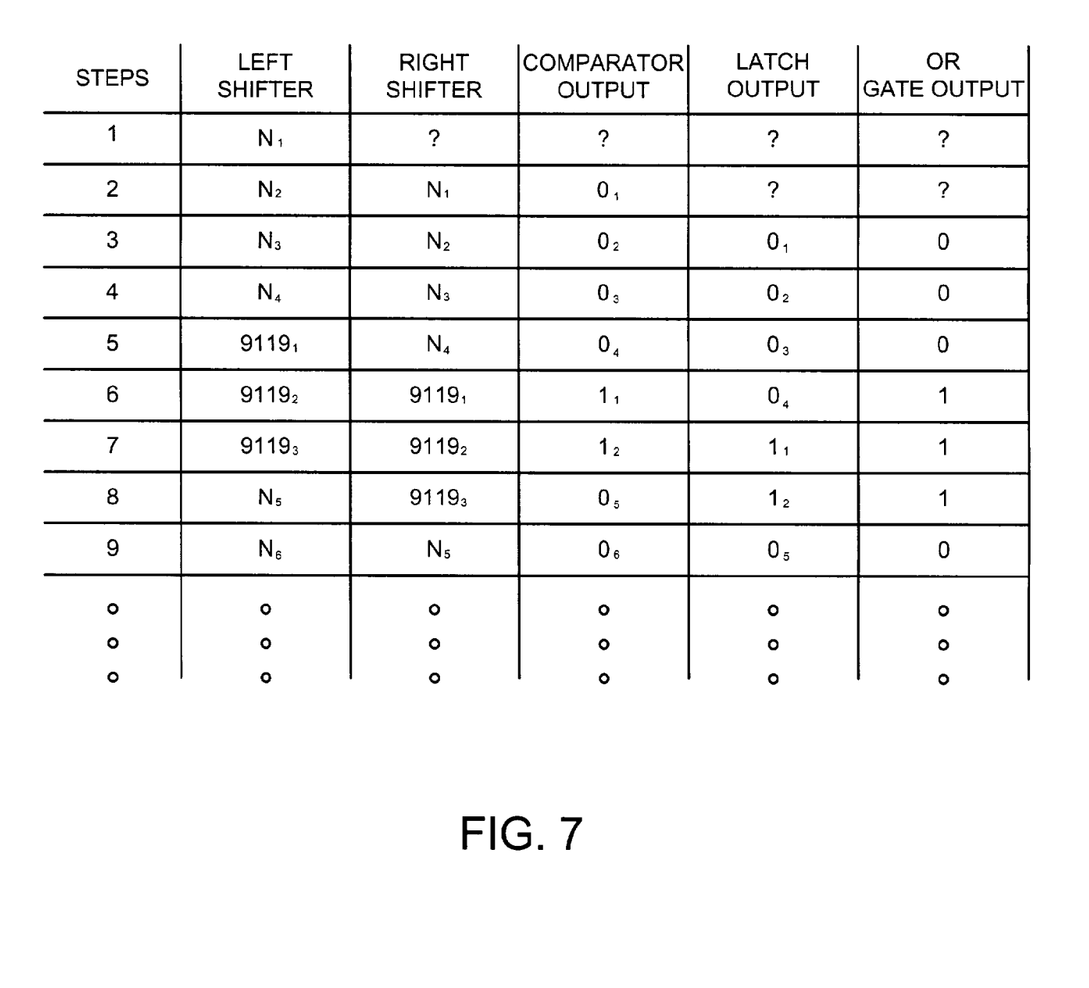
FIG. 7 is a truth table of a cryptographic module used in the present invention.

FIG. 7 is a truth table of the cryptographic core 610. For a better understanding, FIG. 7 should be viewed in conjunction with FIG. 6. In any event, $N_i$, where i=1, 2, 3, ..., represents the random numbers in the order they are generated and "?" is an undetermined value. Undetermined values are discarded. The output of the comparator, latch and OR gate is indicated as zero (0) denoting a low bit and one (1) a high bit. As mentioned before, when two random numbers or a random number and a "9119" number are each in the shift registers 655 and 660, the comparator outputs a low bit (assuming that the numbers are different from each other). When both registers contain each the same number, as in the case when a string of "9119s" is transferred to the cryptographic core 610, the comparator outputs a high bit.

In Chapter 4.9 of FIPS PUB 140-2, it is specifically stated that a first number should be generated upon powering the system up. This first number should only be used for testing purposes and not for cryptographic purposes. The truth table includes this first number (i.e., $N_1$) generated from a power-up state and therefore is not used (see step 2). Note that if previous numbers had been generated or used before, then $N_1$, will not be present in the table and nor will any undetermined value be present.

In any case, at step 3, both registers contain a different random number (i.e., $N_2$ and $N_3$). Consequently, $N_2$ is used as the output of the OR gate is low. When the first "9119" number is in register 655, shift register 660 will contain a random number. Again, assuming that the random number and the "9119" are different from each other, the comparator will output a low bit. The latch will also output a low bit, since the previous output of the comparator was a low bit. Hence, the output of the OR gate 680 will be low, indicating that the number in register 660 is to be used (step 5). At step 6, both registers will contain a "9119" number; hence, the output of the comparator will be high. This, in turn, will have the OR gate output a high bit and the number in shift register 660 will be discarded. The cryptographic device 690 will resume using numbers from the shift register 660 at step 9.

Figure 8:
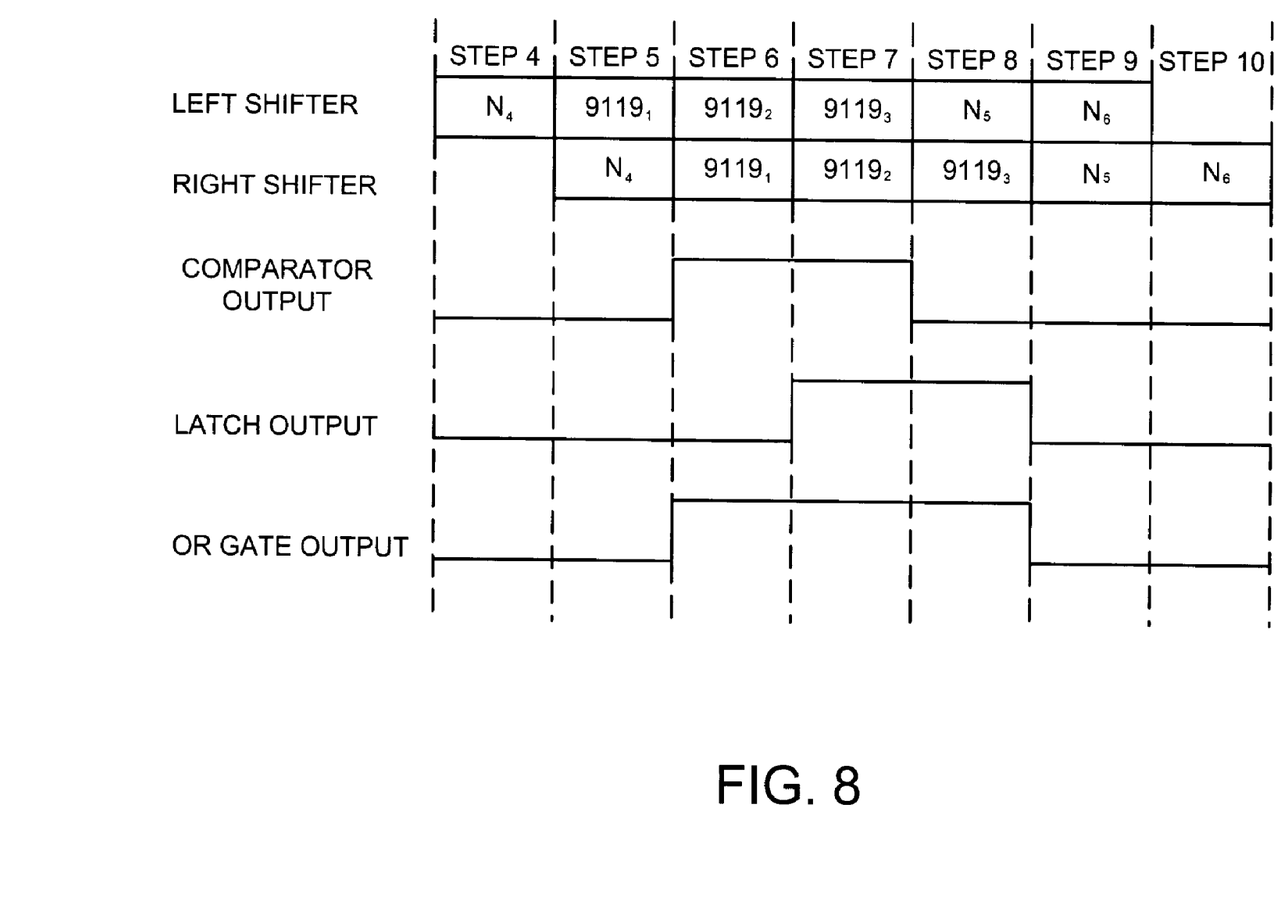
FIG. 8 is a portion of a timing diagram of the truth table in FIG. 7.

FIG. 8 is a portion of a timing diagram of the cryptographic module 610 as depicted in the truth table of FIG. 7. There, it is shown that whenever the shift register 660 (i.e., right shifter as used in the figure) contains a "9119" number, the output of the OR gate is high inhibiting the cryptographic device 690 from using the number.

The description of the present invention has been presented for purposes of illustration and description, and is not intended to be exhaustive or limited to the invention in the form disclosed. Many modifications and variations will be apparent to those of ordinary skill in the art. For example, any method of signaling the cryptographic device to stop cryptographic functions may be used instead of the n-bit blocks of "9119". The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of ensuring that only randomly-generated numbers that have passed a built-in self-test (BIST) are used to perform cryptographic functions comprising:

generating a random number;

performing a BIST on the generated random number in a random number generator core (RNG core); and transferring to a cryptographic device, using one transmission line, the generated random number when the generated random number passed the BIST, and transferring to the cryptographic device, using the one transmission line, a signal when the generated random number failed the BIST, the signal being a continuous transfer of a pre-determined number which indicates that the generated random number has failed the BIST, wherein the one transmission line is the only coupling between the RNG core and the cryptographic device capable of transmitting (i)the generated random number, and (ii)the signal, wherein the cryptographic device is configured to receive both the generated random number and the signal from the RNG core on the one transmission line, the generated random number being used for cryptographic functions by the cryptographic device.

2. The method of claim 1 wherein when the signal is received, the cryptographic device ceases to perform all cryptographic functions.

3. An apparatus for ensuring that only randomly generated numbers that have passed a built-in self-test (BIST) are used to perform cryptographic functions comprising:

means for generating a random number;

means for performing a BIST on the generated random number in a random number generator core (RNG core); and means for transferring to a cryptographic device, using one transmission line, the generated random number when the generated random number passed the BIST, and transferring to the cryptographic device, using the one transmission line, a signal when the generated random number failed the BIST, the signal being a continuous transfer of a pre-determined number which indicates that the generated random number has failed the BIST, wherein the one transmission line is the only coupling between the RNG core and the cryptographic device capable of transmitting (i)the generated random number, and (ii)the signal, wherein the cryptographic device is configured to receive both the generated random number and the signal from the RNG core on the one transmission line, the generated random number being used for cryptographic functions by the cryptographic device.

4. The apparatus of claim 3 wherein when the signal is received, the cryptographic device ceases to perform all cryptographic functions.

5. The apparatus of claim 4 further comprising a comparator, the comparator including a first and second registers for storing a preceding transferred number and a succeeding transferred number, the preceding transferred number and the succeeding transferred number being compared to each other to determine whether the preceding transferred number and the succeeding number is the signal.

6. The apparatus of claim 5 further comprising a latch wherein a content of the second register is used for cryptographic functions when the content of the second register is different from a content of the first register and the content of the second register is not used for cryptographic functions when the content of the second register is equal to the content of the first register as when a plurality of the predetermined number is transferred such that both a preceding transferred number and a succeeding transferred number are the predetermined number, the latch for ensuring that a predetermined number in the second register is not used for cryptographic functions when the content of the first register is different from the content of the second register.

7. A system for ensuring that only randomly-generated data that has passed a built-in self-test (BIST) is used for performing cryptographic functions comprising:
at least one random generator for generating the random data;
at least one processor in a random number generator core (RNG core); and
at least one storage device for storing the generated random data, the at least one processor for performing a BIST on the generated random data and for transferring to a cryptographic device, using one transmission line, the generated random number when the generated random number passed the BIST, and transferring to the cryptographic device, using the one transmission line, a signal when the generated random number failed the BIST, the signal being a continuous transfer of a pre-determined number which indicates that the generated random number has failed the BIST, wherein the one transmission line is the only coupling between the RNG core and the cryptographic device capable of transmitting (i)the generated random number, and (ii)the signal, wherein the cryptographic device is configured to receive both the generated random number and the signal from the RNG core on the one transmission line, the generated random number being used for cryptographic functions by the cryptographic device.

8. The system of claim 7 wherein when the signal is received, the cryptographic device ceases to perform all cryptographic functions.

9. A system for ensuring that only randomly generated data that has passed a built-in self-test (BIST) is used for performing cryptographic functions comprising:
at least one random number generator (RNG) core, the RNG core for collecting random bits to be used as seeds for generating random numbers;
at least one storage device for storing the random bits collected by the RNG core wherein the RNG core, upon request, generates a random number using the stored random bits;
a cryptographic device for performing cryptographic functions using the generated number;
at least one processor for processing the random number wherein processing the random number includes running a BIST on the generated number; and
one output connection connecting the RNG core to the cryptographic device, the one output connection for transmitting an output of the RNG core to the cryptographic device, the output of the RNG core being the generated random number when the generated random number passes the BIST and the output of the RNG core being a signal indicating that the generated random number fails the BIST when the generated random number has failed the BIST, the signal being a plurality of a predetermined number, wherein the one output connection is the only coupling between the RNG core and the cryptographic device capable of transmitting (i)the generated random number, and (ii)the signal, wherein the cryptographic device is configured to receive both the generated random number and the signal from the RNG core on the one output connection, the cryptographic device including a comparator having a first shift register, a second shift register and a latch, the first shift register for taking in as content a preceding output of the RNG core at a preceding processing step, for shifting the preceding output of the RNG core into the second shift register in order for the second shift register to have as content the preceding output of the RNG core and to take in as content a succeeding output of the RNG core at a succeeding processing step wherein the comparator compares the content of the first shift register and the content of the second register at every processing step and wherein the content of the second shift register is used for cryptographic functions when the content of the second shift register is different from the content of the first shift register and the content of the second shift register is not used for cryptographic functions when the content of the second shift register is equal to the content of the first shift register as when a plurality of the predetermined number is outputted by the processor such that both a preceding output and a succeeding output of the RNG core are the predetermined number, the latch for ensuring that a predetermined number in the second shift register is not used for cryptographic functions when the content of the first shift register is different from the content of the second shift register.

10. The system of claim 9 wherein a first number generated at startup is not used for cryptographic purposes.

11. The method of claim 1, wherein the one transmission line comprises a plurality of parallel transmission paths configured to transfer in parallel data bits of one of (i) the generated random number and (ii) the signal.

12. The apparatus of claim 3, wherein the one transmission line comprises a plurality of parallel transmission paths configured to transfer in parallel data bits of one of (i) the generated random number and (ii) the signal.

13. The system of claim 7, wherein the one transmission line comprises a plurality of parallel transmission paths configured to transfer in parallel data bits of one of (i) the generated random number and (ii) the signal.

14. The system of claim 9, wherein the one output connection comprises a plurality of parallel transmission paths configured to transfer in parallel data bits of one of (i) the generated random number and (ii) the signal.

* * * * *